US009180960B2

(12) United States Patent
Rosman

(10) Patent No.: US 9,180,960 B2
(45) Date of Patent: Nov. 10, 2015

(54) BORON FIBER REINFORCED STRUCTURAL COMPONENTS

(75) Inventor: Richard R. Rosman, Seattle, WA (US)

(73) Assignee: The Boeing Company, Chicago, IL (US)

(*) Notice: Subject to any disclaimer, the term of this patent is extended or adjusted under 35 U.S.C. 154(b) by 313 days.

(21) Appl. No.: 13/157,647

(22) Filed: Jun. 10, 2011

(65) Prior Publication Data

US 2012/0312922 A1    Dec. 13, 2012

(51) Int. Cl.
| | |
|---|---|
| *B32B 5/26* | (2006.01) |
| *B64C 1/06* | (2006.01) |
| *B64C 1/12* | (2006.01) |
| *B64C 1/26* | (2006.01) |
| *B32B 5/12* | (2006.01) |
| *B64C 1/00* | (2006.01) |

(52) U.S. Cl.
CPC ... *B64C 1/26* (2013.01); *B32B 5/12* (2013.01); *B32B 5/26* (2013.01); *B64C 1/065* (2013.01); *B64C 1/12* (2013.01); *B32B 2260/023* (2013.01); *B32B 2260/046* (2013.01); *B32B 2262/10* (2013.01); *B32B 2313/02* (2013.01); *B32B 2605/18* (2013.01); *B64C 2001/0072* (2013.01); *Y02T 50/433* (2013.01); *Y10T 29/49826* (2015.01); *Y10T 428/23* (2015.01)

(58) Field of Classification Search
CPC .............. B64C 1/12; B64C 1/06; B64C 1/26; B64C 1/065; B64C 2001/0054; B64C 2001/0072; B32B 5/26
USPC ........ 428/105, 113, 114, 292.1, 297.4, 299.1, 428/300.4, 300.7, 366, 704; 244/119, 133
See application file for complete search history.

(56) References Cited

U.S. PATENT DOCUMENTS

| | | | | |
|---|---|---|---|---|
| 3,885,071 | A | * | 5/1975 | Blad et al. .......... 428/60 |
| 4,177,306 | A | * | 12/1979 | Schulz et al. ......... 428/107 |
| 5,139,843 | A | * | 8/1992 | Murakami et al. ...... 428/116 |
| 5,554,430 | A | * | 9/1996 | Pollatta et al. ........ 428/113 |
| 5,866,272 | A | | 2/1999 | Westre et al. |
| 6,114,050 | A | | 9/2000 | Westre et al. |
| 6,500,370 | B1 | | 12/2002 | Belvin et al. |
| 7,134,629 | B2 | | 11/2006 | Johnson et al. |
| 7,469,735 | B2 | | 12/2008 | Brown et al. |

(Continued)

OTHER PUBLICATIONS

Partial European Search Report dated Apr. 22, 2014 from Application Serial No. 12167936.9.

(Continued)

*Primary Examiner* — Maria Veronica Ewald
*Assistant Examiner* — Joanna Pleszczynska

(57) ABSTRACT

This disclosure is directed to a boron reinforced composite structural member. The concepts and technologies illustrated in this disclosure are taught within the context of a boron reinforced aircraft keel. A boron reinforced composite structural member may be constructed of a structural member core and a surrounding structural member casing. In one embodiment, the structural member core includes alternating layers of boron fiber reinforced plies and layers of interior carbon fiber reinforced plies. The boron fiber reinforced plies are oriented in a longitudinal direction, and the interior carbon fiber reinforced plies are oriented diagonally, perpendicular, and parallel to the boron fiber reinforced plies. The structural member casing includes layers of exterior carbon fiber reinforced plies that substantially surround the structural member core.

6 Claims, 7 Drawing Sheets

(56) References Cited

U.S. PATENT DOCUMENTS 7,527,222 B2  5/2009  Biornstad et al.
2011/0073708 A1  3/2011  Biornstad et al.

OTHER PUBLICATIONS

Extended European Search Report dated Sep. 30, 2014 from Application Serial No. 12167936.9.

* cited by examiner

BORON FIBER REINFORCED STRUCTURAL COMPONENTS

BACKGROUND

Conventional passenger and cargo aircraft are typically configured as high or low wing aircraft. In those aircraft the wings are positioned above or below the passenger or cargo compartment within the fuselage, and the wings are attached to the fuselage through a wing structural box. The fuselage is attached at the top or bottom to the wing structural box depending on whether the aircraft is configured as a high-wing or low-wing aircraft. The wing structural box is typically very heavy since it needs to be substantial enough to bear a large portion of the wing loads and support the fuselage. The wing may also be mounted through a cutout portion of the fuselage, in which case fuselage reinforcement may be required to maintain the fuselage structural integrity.

An aircraft fuselage is designed to bear many types of loads. First, the fuselage must support hoop stress created from the pressurization of the fuselage during flight. The fuselage must also support tension, compression, and shear forces caused by bending and torsion of the fuselage resulting from the movement of the aircraft flight surfaces used to control the aircraft. The fuselage must also support the forces acting during landing, and from external air pressure and velocity changes such as those experienced during maneuvers while flying, during turbulence, or wind shear conditions. The skin assembly of an aircraft usually bears a large portion of these loads. The fuselage frame includes various stringers and bulkheads that further support the skin assembly and the loads experienced during flight operations.

Large aircraft are frequently built using an aluminum monocoque fuselage. One method of constructing an aluminum monocoque fuselage includes erecting a series of frames, shaped like the fuselage cross-section, and joining these frame sections with longitudinal stringers to create a fuselage section. The fuselage section is then sheathed with a skin of sheet aluminum, attached by riveting or by bonding with adhesives. Fuselage sections are then typically joined with fasteners to form the complete fuselage. In larger aircraft an aluminum keel is usually attached to the interior floor of the fuselage. The keel typically helps reinforce the area where the wing and main landing gear require a large fuselage cutout.

Another method of constructing a section of a monocoque fuselage includes placing layers of carbon fiber reinforced fabric around a rotating mandrel with reinforced fabric placement machines. In this way a composite barrel section is formed and one or more barrel sections may be connected to construct the fuselage. Examples of fabric placement machine technologies include automated fiber placement, automated tape laying, and filament winding. The mandrel provides the basic shape of a fuselage section and layers of carbon fiber reinforced fabric are applied over the rotating mandrel to form an interior skin of the fuselage section. With regard to some methods of constructing a section of a monocoque fuselage, the interior skin is typically covered with a layer of honeycomb core. The fabric placement machine then applies layers of carbon fiber reinforced fabric over the honeycomb core to form an exterior skin. The interior skin, honeycomb core, and exterior skin together form a skin assembly. With regard to other methods of constructing a section of a monocoque fuselage, the mandrel provides the shape of the interior skin and integral stringers. The skin and stringers are placed on the mandrel and co-cured to form a completed fuselage skin.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

One embodiment of the present disclosure is directed to a laminated boron composite structural member. The laminated boron composite structural member has a structural member core substantially surrounded by a structural member casing. The structural member core includes layers of boron fiber reinforced plies oriented in a substantially longitudinal direction. Between adjacent layers of boron fiber reinforced plies are carbon fiber reinforced plies. Some carbon fiber reinforced plies are orientated substantially diagonal to the boron fiber reinforced plies. Other carbon fiber reinforced plies are orientated substantially perpendicular to the boron fiber reinforced plies. And other carbon fiber reinforced plies are orientated substantially parallel to the boron fiber reinforced plies. At least one exterior carbon fiber reinforced ply, configured to define a structural member casing, substantially surrounds the boron fiber reinforced plies and carbon fiber reinforced plies that define the structural member core.

Another embodiment of the present disclosure is directed to an improved aircraft fuselage. There the aircraft fuselage has a mid-fuselage section, such as a fuselage barrel with a first end and an opposite second end, and a cutout for the wings and/or landing gear located between the two ends. The mid-fuselage section is fabricated with a fiber reinforced skin, such as carbon fiber reinforced plastic that extends from the first end to the second end. Within the mid-fuselage section is positioned a boron composite structural member in the form of a keel, which extends the length of the cutout and then tapers into the mid-fuselage section. In some embodiments the keel is longer than the mid-fuselage section such that it extends or tapers beyond the first end or the second end. The boron composite keel is attached to the interior side or the exterior side of the fiber reinforced skin by reinforced fiber plies. These reinforced fiber plies are placed in layers, some substantially perpendicular to the boron composite keel and some substantially diagonal to the boron composite keel.

Yet another embodiment of the present disclosure provides methods for assembling an aircraft fuselage. The operations of one embodiment includes providing a mid-fuselage section, such as a fuselage barrel that has a first end and second end, and providing a boron reinforced keel. The boron reinforced keel is secured to the mid-fuselage section such that a first portion of the boron reinforced keel extends beyond the first end of the mid-fuselage section. The first portion of the boron reinforced keel is secured to the second fuselage section, which is spliced to the mid-fuselage section.

The features, functions, and advantages that have been discussed can be achieved independently in various embodiments of the present disclosure or may be combined in yet other embodiments without departing from the scope of this disclosure. These and various other features are taught and will be apparent from a reading of the following Detailed Description and a review of the associated drawings.

DETAILED DESCRIPTION

Figure 1:
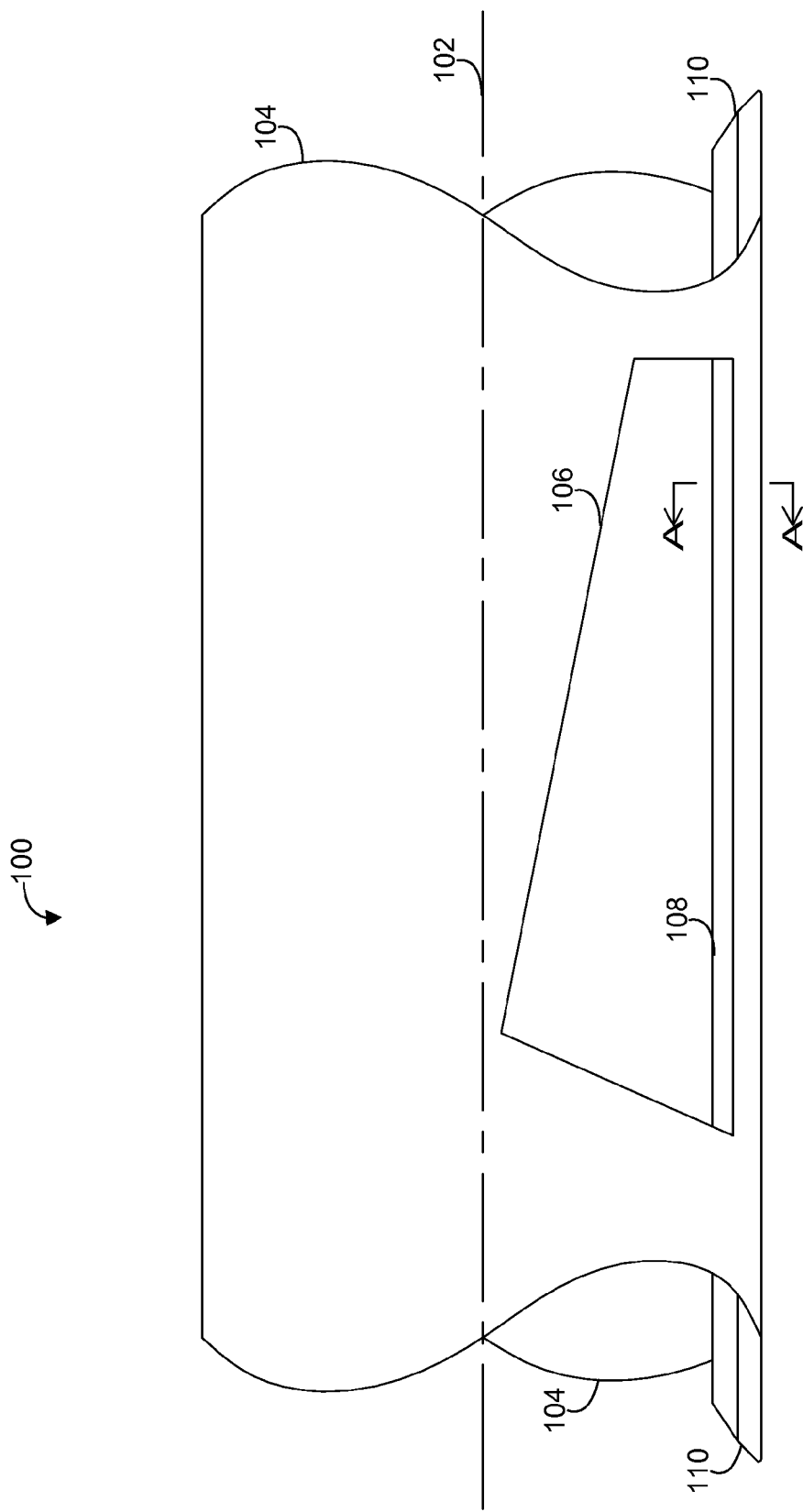
FIG. 1 illustrates an exemplary mid-fuselage barrel section of an aircraft fuselage.

The following Detailed Description is directed to an improved composite structural member and to an improved aircraft fuselage, which incorporate various features described below to eliminate circumferential splices in the most highly loaded section of the fuselage, eliminate keel splice components, provide concentrated stiffness and strength where needed, decrease aircraft weight, and simplify fuselage assembly. As discussed herein, one method of constructing a monocoque fuselage includes forming one or more composite barrel sections and then connecting together the barrel sections to construct the fuselage. A conventional passenger or cargo aircraft is usually reinforced by a keel, typically positioned longitudinally with respect to the fuselage and attached to the interior or exterior of the fuselage frame or skin assembly.

A fuselage constructed of composite barrel sections may require a keel that spans multiple composite barrel sections. Further, a composite barrel section may include at least one large cutout to accommodate a wing-box or landing gear or cargo ramp. As a result, a conventional keel may require extensive mechanical fastening to the fuselage frame or skin assembly in order to be attached to one or more composite barrel sections. Similarly, composite barrel sections that may require framing or reinforcing with structural members may require extensive mechanical fastening to the fuselage frame or skin assembly. Similarly, composite barrel sections may require extensive mechanical fastening to be joined one to another.

Utilizing the concepts and technologies described herein, boron reinforced composite structural members provide improved methods for structurally reinforcing a fuselage, and for assembling an aircraft. The concepts and technologies illustrated herein are taught within the context of aircraft, but may be easily adapted to other designs and environments that require structural reinforcement, incorporate composite materials, include beams bending in compression, or where there is a desire for improved assembly. Examples for such adaptations include building construction, manufacturing of durable goods including automobiles and watercraft, assemblies subject to harsh conditions such as satellites in orbit, combinations thereof, and the like. Accordingly, for the present purposes of illustration and teaching, and not restriction or limitation, the concepts and technologies taught herein are illustrated within the context of an aircraft fuselage and keel.

Certain details and features are set forth herein and in FIGS. 1-5 to describe and teach, by way of exemplary embodiments, illustrations, or examples, various embodiments of the manufacture and use of a boron composite structural member. Many of the details and features discussed or shown in the figures are merely representative and illustrative of particular embodiments. Accordingly, other embodiments may have other details and features without departing from the scope of the disclosure and claims. In addition, other embodiments can be practiced without details and features described herein. Referring now to the figures, in which like numerals represent like elements throughout the several figures, a boron composite structural member according to the various embodiments will be described.

Turning now to FIG. 1, there is illustrated a mid-fuselage barrel 100 having a longitudinal axis 102. In one embodiment fuselage barrel sections, such as the illustrated mid-fuselage barrel 100, are individually fabricated as a one-piece section from carbon fiber composite material. In alternative embodiments, fuselage components such as half-barrel sections, quarter-barrel sections, and panels are individually fabricated from carbon fiber composite materials and joined together. "Carbon fiber reinforced plastic" (CFRP) is the general term that includes the type of carbon fiber composite material used to fabricate a carbon fiber composite fuselage barrel, a carbon fiber composite fuselage component, and the like.

After fabrication, the CFRP fuselage barrels or fuselage components can be joined together along circumferential joints 104, by adhesive bonding and/or mechanical fastening, to form a fuselage. Details describing well-known CFRP methods and CFRP systems often associated with CRFP fabrication techniques are not set forth in the following disclosure, to avoid unnecessarily obscuring the description of the various embodiments of the present disclosure.

The mid-fuselage barrel 100 illustrated in FIG. 1 includes a cutout in the form of a pair of opposing wing apertures 106, behind which the wing box and landing gear (not shown) may be positioned and through which the wings (not shown) are attached. Also shown is a composite structural member 108 in the form of an integral fuselage keel, orientated substantially parallel to the longitudinal axis 102 and best described in that form with reference to FIGS. 4A-C.

In some embodiments the composite structural member 108 extends substantially the length of the opposing wing apertures 106, and then tapers to attach at each end to the mid-body fuselage 100. For example, the composite structural member 108 may taper at one or both ends to attach to a structural element, such as a mid-body fuselage stringer (not shown). In some embodiments the composite structural member 108 may extend two or three frame bays forward of the opposing wing apertures 106 before tapering to attach at that end to the mid-body fuselage 100. In other embodiments the composite structural member 108 may extend three or four frame bays aft of the opposing wing apertures 106 before tapering to attach at that end to the mid-body fuselage 100. In still other embodiments the composite structural member 108 may extend both forward and aft of the opposing wing apertures 106 before tapering to attach to the mid-body fuselage 100. Additional embodiments provide for the composite structural member 108 extending forward and/or aft of the mid-body fuselage 100 to attached to an adjacent forward and/or aft fuselage section.

The composite structural member 108 may have design features, such as a flange 110. As explained below, the composite structural member 108 may be of any design configuration and may include features related to the design configuration or to the securing or attaching of the composite structure member 108 to the mid-body fuselage 104. For example, a flange 100 may provide a stiffer composite structural member 108 while providing a structure for securing or attaching the composite structural member 108 to the mid-body fuselage 104.

Generally speaking, CFRP used to fabricate the mid-fuselage barrel 100 or composite structural member 108 includes a reinforcement and a resin. The reinforcement may comprise, for example, fabric, tape, film, foil, fibers, combinations thereof, and the like. Fibers may comprise, for example, carbon, aramid, quartz, combinations thereof, and the like. The resin may comprise thermoset and thermoplastic resins. Thermoset resins include epoxy, polyurethane polyester, phenolic resins, vinyl ester and polyimide resins, combinations thereof, and the like. Thermoplastic resins may comprise, for example, acetal resins, polypropylene, polycarbonate, nylon, combinations thereof, and the like. To facilitate adhesion of the composite material to a form, substrate, or other ply, the composite material is typically bonded and cured. For the purposes of the present teaching, the terms "ply" and "layer" are fully interchangeable, whether in the singular or plural.

Boron is a chemical element and generally considered a metalloid. Boron is also, relatively speaking, a rare element. Characteristics of boron and boron rich compounds include extreme stiffness and rigidity. Examples of boron rich compounds include but are not limited to heterodiamond, boron nitride, rhenium diboride, boron carbide, cubic boron, borates, borides, combinations thereof, and the like. For the present purposes of teaching and as used herein, the term "boron" includes any reinforcements, resins, fibers, materials, compositions, compounds, derivatives, combinations thereof, and the like, that includes boron.

Boron can be used to produce boron fibers. Boron fibers are often produced by chemical vapor deposition, a process where boron is deposited on a tungsten wire to produce fibers approximately 0.004 inches (0.10 millimeters) in diameter. Boron fibers can be combined with other materials, such as carbon fibers, to form a composite material that can be used to fabricate products that would benefit from boron's characteristics. For example, because of their high stiffness and large diameter, a composite material reinforced with boron fibers can be used to carry high compressive loads, such as those experienced by an aircraft keel.

Figure 2:
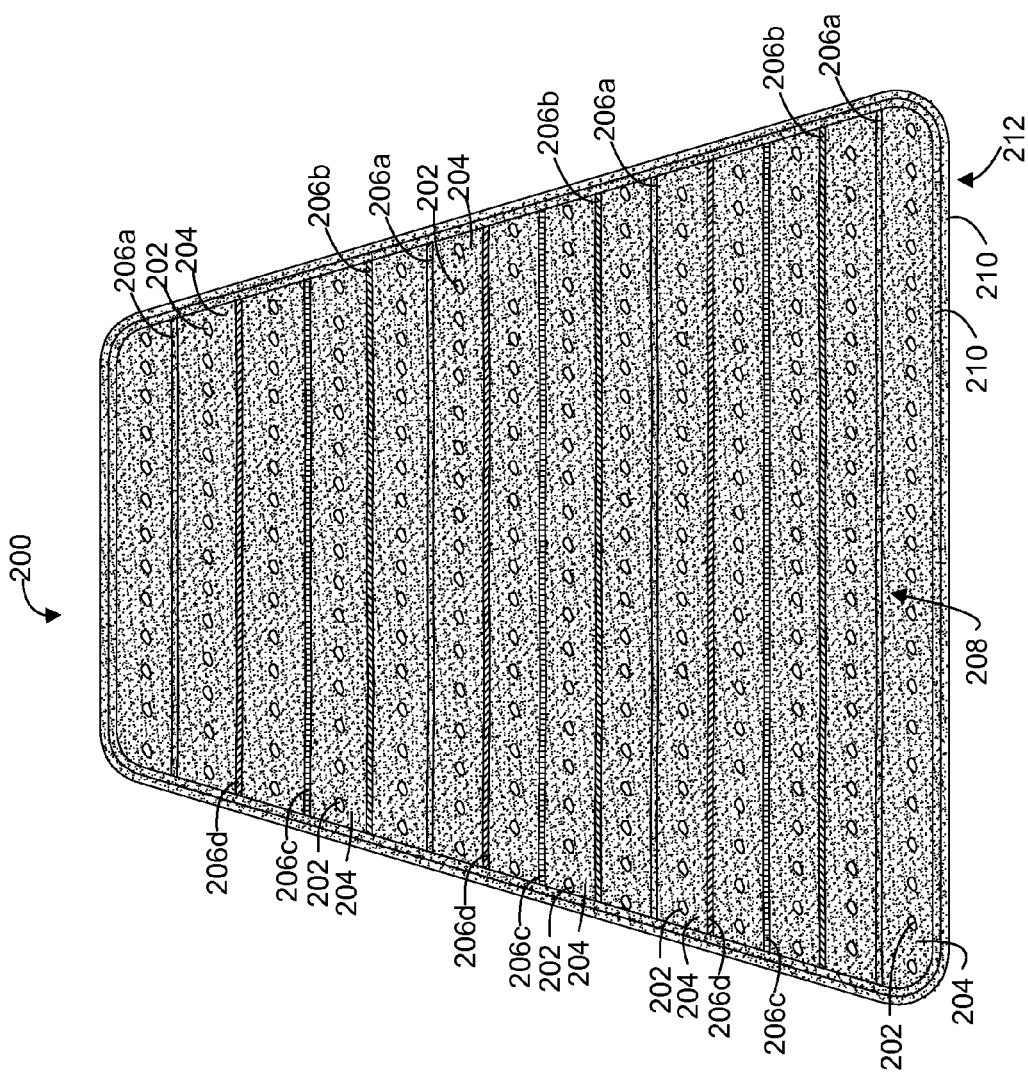
FIG. 2 illustrates a cross-sectional view of an exemplary composite structural member.

FIG. 2 is a cross-sectional view of an exemplary composite structural member 200. This composite structural member 200 is illustrative of any structural member that can be fabricated according to the present disclosure; accordingly, embodiments are not limited to the trapezoid shape of the illustrated composite structural member 200. For example, other composite structural member embodiments may have a cross-sectional shape of common geometric shapes such as square, rectangular, circular, elliptical, combinations thereof, and the like. Further, other composite structural member embodiments may have a cross-sectional configuration similar to common building construction shapes, such as a "C" channel, an "I" or "H" beam, a "L" angle, a "T" bar, combinations thereof, and the like. In addition, other composite structural member embodiments may have features or structures, such as flanges, sleeves, apertures, anchors, or arms that provide an attachment structure, combinations thereof, and the like as determined by design criteria. Other structural member embodiments may have a unique or unusual cross sectional shape, as determined by design criteria.

The illustrated composite structural member 200 comprises boron fiber reinforced plies 202 and carbon fibers 204. Here, the boron fiber reinforced plies 202 are shown orientated in the longitudinal direction or in the 0° ply, a terming convention referencing the angle of the fibers with respect to the longitudinal centerline of the surface. In alternative embodiments, the boron fiber reinforced plies 202 may be oriented in the 0° or ±45° or 90° direction, or any other direction as determined by design criteria. A ply orientated in the 0° or ±45° or 90° direction, may be referred to as parallel (interior or exterior) fiber reinforced ply, diagonal (interior or exterior) fiber reinforced ply, and perpendicular (interior or exterior) fiber reinforced ply, respectively. For the present purposes of teaching and as used herein, the term "diagonal" includes any orientation or angle except 0° (parallel) or 90° (perpendicular).

The illustrated composite structural member 200 also comprises interior carbon fiber reinforced plies 206a-d. Adjacent some boron fiber reinforced plies 202 are 0° carbon fiber reinforced plies 206a. These may also be referred to as parallel interior fiber reinforced plies 206a. Also adjacent some boron fiber reinforced plies 202 are +45° carbon fiber reinforced plies 206b. These may also be referred to as diagonal interior fiber reinforced plies 206b. Adjacent some boron fiber reinforced plies 202 are 90° carbon fiber reinforced plies 206c. These may also be referred to as perpendicular interior fiber reinforced plies 206c. Also adjacent some boron fiber reinforced plies 202 are −45° carbon fiber reinforced plies 206d. These may also be referred to as diagonal interior fiber reinforced plies 206d. In alternative embodiments, the carbon fiber reinforced plies 206a-d may be oriented in any other direction as determined by design criteria. Together the boron fiber reinforced plies 202 and interior carbon fiber reinforced plies 206a-d define a structural member core 208. Surrounding the illustrated structural member core 208 are exterior carbon fiber reinforced plies 210 that define a structural member casing 212.

Figure 3:
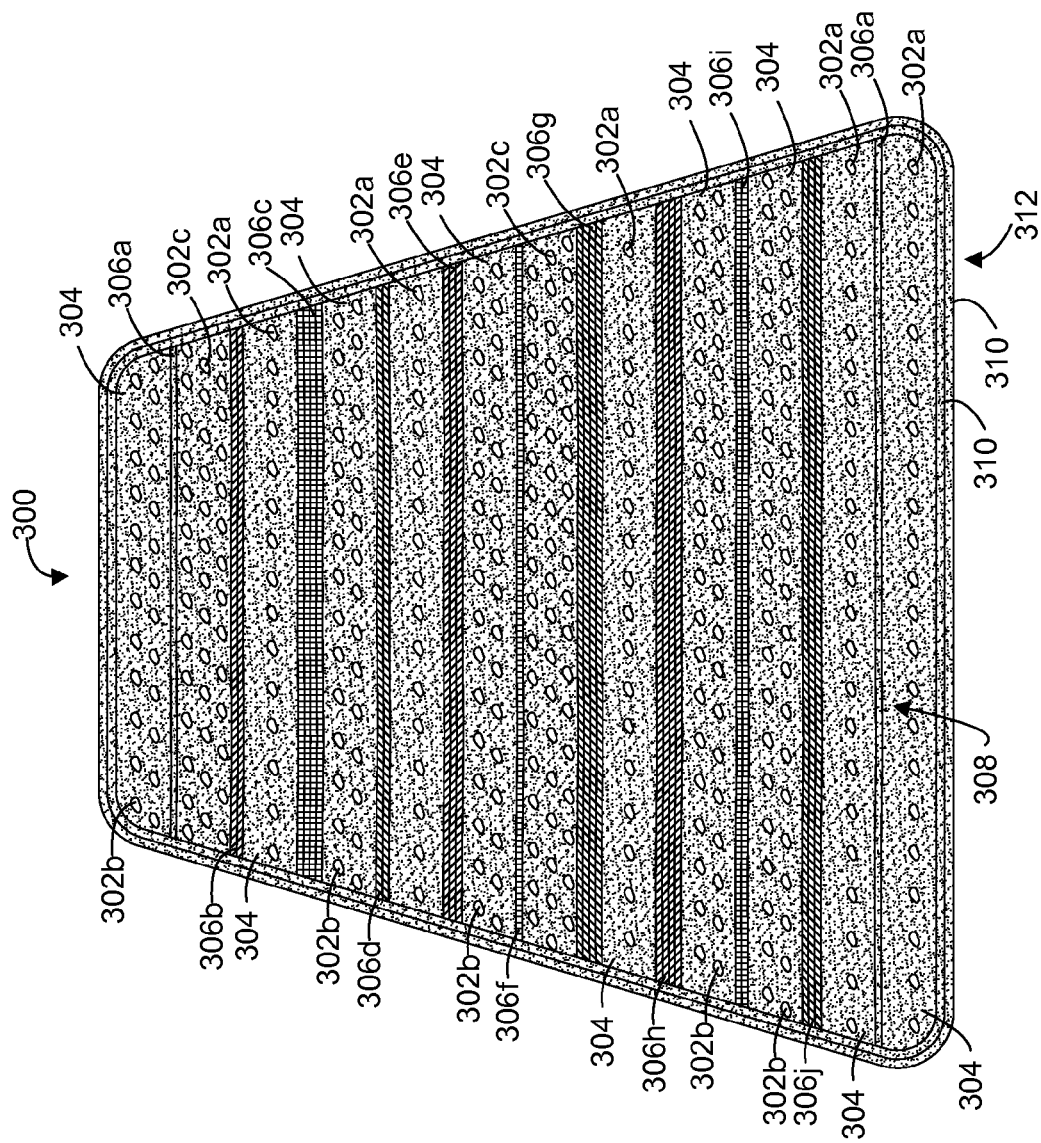
FIG. 3 illustrates a cross-sectional view of an alternative exemplary composite structural member.

Turning now to FIG. 3, there is shown a cross-sectional view of another exemplary composite structural member 300. The illustrated composite structural member 300 comprises boron fiber reinforced plies 302a-c and carbon fibers 304. Here, the boron fiber reinforced plies 302a-c are shown orientated in the longitudinal direction or in the 0° ply. In alternative embodiments, the boron fiber reinforced plies 302a-c may be oriented in the 0° or ±45° or 90° direction, or any other direction as determined by design criteria. A ply orientated in the 0° or ±45° or 90° direction, may be referred to as parallel (interior or exterior) fiber reinforced ply, diagonal (interior or exterior) fiber reinforced ply, and perpendicular (interior or exterior) fiber reinforced ply, respectively. In addition, a composite structural member 300 may comprise various combinations of boron fiber reinforced plies 302a-c, such as but not limited to a single layer boron fiber reinforced ply 302a, a double layer of boron fiber reinforced plies 302b, and a triple layer of boron fiber reinforced plies 302c. In alternative embodiments the boron fiber reinforced plies 302a-c comprise any combination of plies and be oriented in any other direction, as determined by design criteria.

The illustrated composite structural member 300 also comprises interior carbon fiber reinforced plies 306a-j, which may include various layers and orientations. For example, there is shown a single 0° carbon fiber reinforced layer 306a, a double −45° carbon fiber reinforced layer 306b, a quadruple 90° carbon fiber reinforced layer 306c, a double +45° carbon fiber reinforced layer 306d, a quadruple −45° carbon fiber reinforced layer 306e, a single 90° carbon fiber reinforced layer 306f, a quadruple +45° carbon fiber reinforced ply 306g, a quadruple −45° carbon fiber reinforced layer 306h, a double 90° carbon fiber reinforced ply 306i, and a triple +45° carbon fiber reinforced ply 306j. A ply orientated in the 0° or ±45° or 90° direction, may be referred to as parallel (interior or exterior) fiber reinforced ply, diagonal (interior or exterior) fiber reinforced ply, and perpendicular (interior or exterior) fiber reinforced ply, respectively. In alternative embodiments the carbon fiber reinforced layers 306a-j may comprise any combination of plies and be oriented in any other direction, as determined by design criteria.

Together the boron fiber reinforced plies 302a-c and interior carbon fiber reinforced plies 306a-j define a structural member core 308. Surrounding the structural member core 308 are exterior carbon fiber reinforced plies 310 that define a structural member casing 312. Here the structural member casing 312 is shown comprising two carbon fiber reinforced plies 310, while in alternative embodiments a structural member casing 312 may comprise any number of carbon reinforced plies, as determined by design criteria.

A process of manufacturing a composite structural member 200, 300 includes laminating and curing. Various methods for applying unidirectional composite fibers are known and may be used to laminate a composite structural member 200, 300. These methods include but are not limited to fiber placement, filament winding, and tape laying. The fiber placement process typically involves the automated placement of multiple "tows" (i.e., untwisted bundles of continuous filaments, such as carbon or graphite fibers, pre-impregnated with a thermoset resin material such as epoxy) and/or other composite materials. Fiber placement machines typically include means for dispensing, clamping, cutting, and restarting individual tows during placement. In a filament winding process a fiber application instrument moves back and forth placing fiber in a predetermined configuration. In some filament winding applications the fiber material is passed through a liquid resin (termed "wet-winding") and in some filament winding applications the fiber material has been pre-impregnated with resin. Tape laying is similar to the fiber placement process except that pre-impregnated fiber tape, rather than individual tows, is laid down to form a component or member. Tape laying can be done with a machine or by hand.

One form of tape includes a paper backing that maintains the width and orientation of the fibers, and the paper backing is removed during application. Another form of tape includes multiple individual fibers woven together with a cloth material. Slit tape is tape that has been slit after being produced; slitting the tape results in narrower widths that allow greater control in application. As used in this disclosure, and unless otherwise indicated, the term "tape" includes tape, tape with backing paper, slit tape, and all other types of composite material in tape form for use in manufacturing composite structures. As used in this disclosure, and unless otherwise indicated, the term "composite material" includes fabric, wet form composite fabric, dry form composite fabric, tape, individual filaments, and other uni- and multi-directional pre-impregnated and non-preimpregnated composite materials and combinations thereof After laminating, a composite structural member 200, 300 is cured. As understood by those skilled in the art, curing may include placing the composite structural member 200, 300 in a vacuum, with or without pressure pads, and applying pressure to evacuate the composite structural member 200, 300. Thereafter the composite structural member 200, 300 may be cured in an autoclave using a standard 350° F. cure cycle. For various embodiments of a composite structural member 200, 300 other cure cycles can be used depending on various factors such as material composition, thickness, and the like. A composite structural member 200, 300 may also be partially cured (typically called "B-Staging") to help stabilize them for incorporation into a larger assembly. A composite structural member 200, 300 that has been B-Stage cured may then be completely cured along with the rest of the assembly.

Figure 4A:
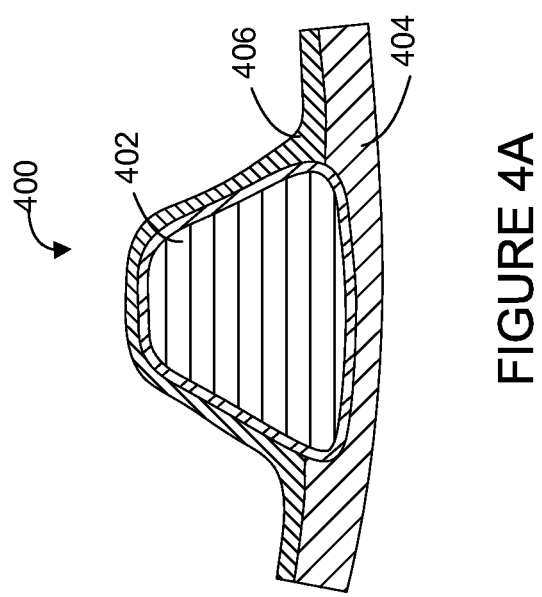
FIGS. 4A-4C illustrates cross-sectional views of exemplary aircraft keels.

A conventional passenger or cargo aircraft is usually reinforced by a keel, typically positioned longitudinally with respect to the fuselage and attached to the interior or exterior of the fuselage frame or skin assembly. Turning now to FIG. 4A, there is illustrated an application of a composite structural member 200, 300 in the form of a single integral fuselage keel 400. The single integral fuselage keel 400 may find application in small to medium aircraft. FIG. 4A shows a cross-sectional view taken along lines A-A of the mid-fuselage barrel 100 shown in FIG. 1. The illustrated single integral fuselage keel 400 comprises a boron composite structural member 402 (comprising a composite structural member 200, 300), co-cured and co-bonded to a mid-fuselage barrel section 404 and carbon reinforced fiber attachment plies 406.

In assembly and application, the single integral fuselage keel 400 is orientated substantially parallel to the longitudinal axis of an aircraft fuselage and positioned where required to structurally reinforce the aircraft fuselage, such as where there is an adjacent cutout for the wings and/or landing gear. The illustrated boron composite structural member 402 is also aligned and collinear with the fuselage lower lobe stringers (not shown). In this way many or some of the boron fiber reinforced plies 202, 302, carbon fibers 204a-c, 304a-c, and interior boron fiber reinforced plies 206a-d, 306a-j may transition from the composite structural member 402 and be attached or secured to the mid-fuselage barrel 100, such as by co-curing and co-bonding, or mechanically connecting to a structure such as but not limited to stringers and/or skin.

In some embodiments the single integral fuselage keel 400 extends substantially the length of the cutout, and then tapers to attach to the mid-fuselage barrel 100. In some embodiments the single integral fuselage keel 400 may extend forward of the cutout before tapering to attach at that end to the mid-fuselage barrel 100. In other embodiments the single integral fuselage keel 400 may extend aft of the cutout before tapering to attach at that end to the mid-fuselage barrel 100. In still other embodiments the single integral fuselage keel 400 may extend both forward and aft of the cutout before tapering to attach to the mid-fuselage barrel 100. In some embodiments the single integral fuselage keel 400 is longer than the mid-fuselage barrel 100 such that it extends or tapers beyond the first end or the second end.

The single integral fuselage keel 400 is attached to the interior side or the exterior side of the mid-fuselage barrel section 404 by carbon reinforced fiber attachment plies 406. These carbon reinforced fiber attachment plies 406 are placed in layers, some substantially perpendicular to the boron composite structural member 402 and some substantially diagonal to the boron composite structural member 402. The carbon reinforced fiber attachment plies 406 are cured and bonded, or co-cured and co-bonded, with the boron composite structural member 402 and mid-fuselage barrel section 404 to form the single integral fuselage keel 400. In this manner the boron composite structural member 402 may be attached or secured to the mid-fuselage barrel section 404.

In assembly and application, the fabrication of the boron composite structural member 402 can be performed concurrently with the layup of the mid-fuselage barrel section 404, or alternatively, as an off-line process. After the boron composite structural member 402 is fabricated it may be partially or B-Stage cured. This would help stabilize the laminate and improve handling for subsequent fabrication. The boron composite structural member 402 would then be ready for incorporation into the mid-fuselage barrel section 404.

After the mid-fuselage barrel section 404 is fabricated, and some amount of carbon fiber reinforced plastic (CRFP) is placed on the mid-fuselage barrel section 404 to provide a base for the boron composite structural member 402, the boron composite structural member 402 is transported and placed on the mid-fuselage barrel section 404. During assembly film adhesive can be applied to stabilize and hold the boron composite structural member 402 to or within the mid-fuselage barrel section 404. Additional carbon reinforced fiber attachment plies 406 could then be placed over the boron composite structural member 402 to encapsulate it to or within the mid-fuselage barrel section 404. In the illustrated embodiment, a sufficient amount of carbon reinforced fiber attachment plies 406 are attached to create a full quasi-isotropic laminate that surrounds the boron composite structural member 402. The sequencing of the boron composite structural member 402 and carbon reinforced fiber attachment plies 406 would be coordinated with the rest of the mid-fuselage barrel section 404 fabrication. Thereafter, the mid-fuselage barrel section 404 with the boron composite structural member 402 and carbon reinforced fiber attachment plies 406 can be vacuum bagged and cured, thus completing the cure of the boron composite structural member 402, and curing and bonding the carbon reinforced fiber attachment plies 406 to the mid-fuselage barrel section 404.

Advantages of a single integral fuselage keel 400 include greater stiffness relative to size when compared to traditional aluminum keels, greater efficiency in carrying compressive loads, elimination of circumferential splices, and elimination of keel splice components. Additional advantages of a single integral fuselage keel 400 include strengthening a monocoque mid-body fuselage barrel fabricated of composite material and weakened by large cutouts, such as the cutouts to accommodate the wings and/or landing gear.

Figure 4B:
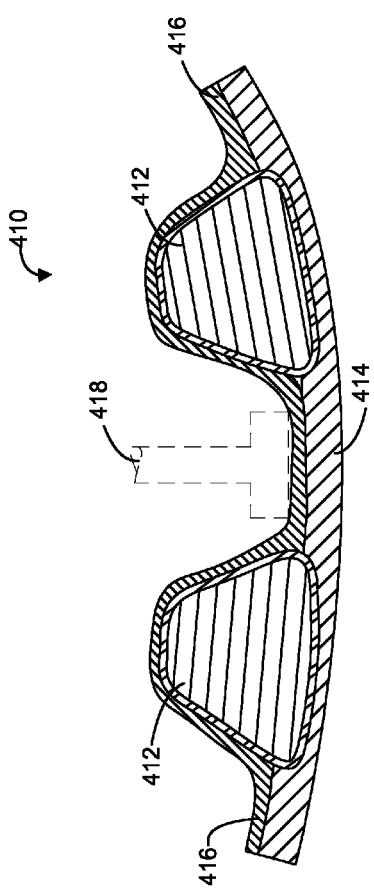

FIG. 4B also shows an application of a composite structural member 200, 300, in the form of a double integral fuselage keel 410. The double integral fuselage keel 410 may find application in medium to large aircraft. The illustrated double integral fuselage keel 410 comprises two boron composite structural members 412 (comprising composite structural member(s) 200, 300), co-bonded to a mid-fuselage barrel section 414 and carbon reinforced fiber attachment plies 416. Also shown is the placement for a keel web 418. Assembly or application of the double integral fuselage keel 410 is similar to the single integral fuselage keel 400 described above.

Advantages of a double integral fuselage keel 410 include greater stiffness relative to size when compared to traditional aluminum keels, greater efficiency in carrying compressive loads, elimination of circumferential splices, and elimination of keel splice components. Additional advantages of a double integral fuselage keel 410 include strengthening a monocoque mid-body fuselage barrel fabricated of composite material and weakened by large cutouts, such as the cutouts to accommodate the wings and/or landing gear. The double integral fuselage keel 410 also provides a measure of fail-safety, should a composite structural member 412 become damaged or otherwise fail.

Figure 4C:
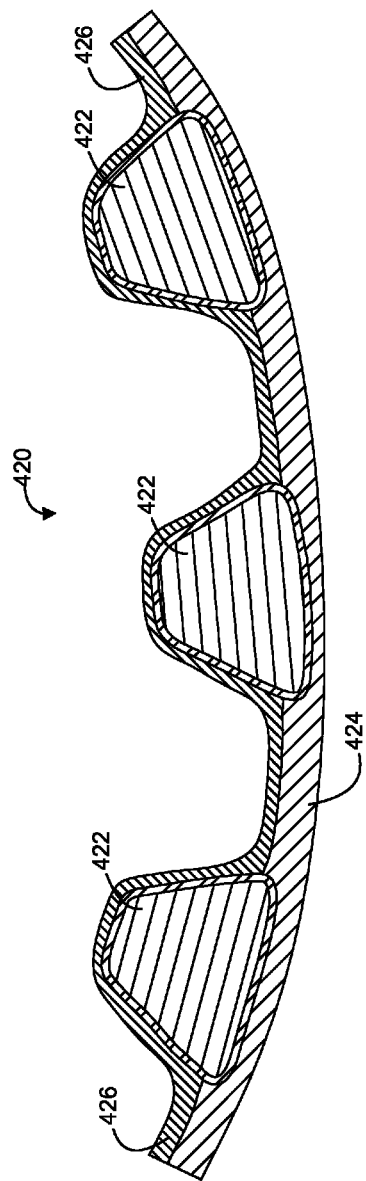

As illustrated in FIG. 4C, there is shown an application for a composite structural member 200, 300, in the form of a triple integral fuselage keel 420. The triple integral fuselage keel 420 may find application in large to jumbo aircraft. The illustrated triple integral fuselage keel 420 comprises three boron composite structural members 422 (comprising composite structural member(s) 200, 300), co-bonded to a mid-fuselage barrel section 424 and carbon reinforced fiber attachment plies 426. Assembly or application of the triple integral fuselage keel 420 is similar to the single integral fuselage keel 400 described above.

Advantages of a triple integral fuselage keel 420 include greater stiffness relative to size when compared to traditional aluminum keels, greater efficiency in carrying compressive loads, elimination of circumferential splices, and elimination of keel splice components. Additional advantages of a triple integral fuselage keel 420 include strengthening a monocoque fuselage barrel fabricated of composite material and weakened by large cutouts, such as the cutouts to accommodate the wings and/or cargo door and ramp. The triple integral fuselage keel 420 also provides a measure of fail-safety, should a composite structural member 422 become damaged or otherwise fail.

In alternative embodiments a boron composite structural member 402, 412, 422 may be attached to any type or kind of mobile craft or vessel that might require localized and highly effective strengthening or reinforcement. Other embodiments may include multiple boron composite structural members 402, 412, 422 attached to any type or kind of stationary structure that might require highly effective strengthening or reinforcement over a large area. In some embodiments the boron composite structural member 402, 412, 422 may be attached with carbon reinforced fiber attachment plys 406, 416, 426, including composite material or tape, and may be co-cured and co-bonded in place. In some alternative embodiments the boron composite structural member 402, 412, 422 may be attached using any type or kind of known mechanical fasteners. For example, a design feature of a boron composite structural member 402, 412, 422 may include a flange 110 comprising carbon fiber reinforced plies 206*a-d* along a side or an end of the boron composite structural member 402, 412, 422. This flange 110 may provide a structure, including sleeves through which bolts are threaded, to attach or secure the boron composite structural member 402, 412, 422. In this way the boron composite structural member 402, 412, 422 may be attached or secured to the mid-fuselage barrel 100 to construct a mechanically attached keel. In alternative embodiments, mechanical attachments such as anchor bolts may be integrated into the flange 110 and/or the boron composite structural member 402, 412, 422 and then attached to the mid-fuselage barrel 100 in order to construct a mechanically attached keel. Alternative embodiments include combinations of the embodiments described herein, and the like.

An advantage of an integral single, double or triple keel 400, 410, 420 having a boron composite structural member 402, 412, 422, is the construction of a mid-fuselage monocoque barrel fabricated of composite material that includes a large cut out for the wings and/or landing gear and eliminates the circumferential joints typically adjacent the wings in large and jumbo aircraft. Another advantage, in some composite material monocoque barrel embodiments, is the elimination of mechanically attached components and circumferential joints.

Figure 5:
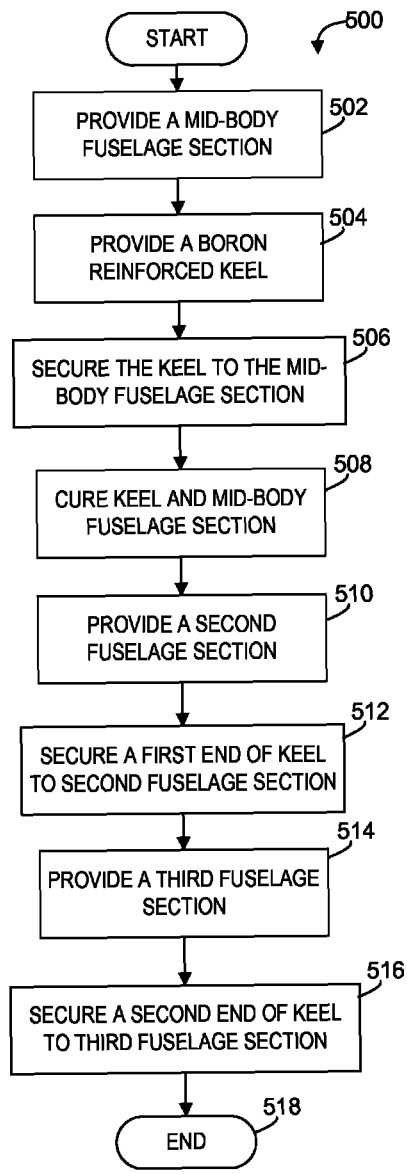
FIG. 5 illustrates a flow chart directed to an exemplary method of assembling an aircraft fuselage having a composite structural member.

Turning now to FIG. 5, an illustrative routine 500 for an exemplary method of assembling an aircraft fuselage comprising a boron reinforced keel will now be described. It should be appreciated that more or fewer operations may be performed than shown in FIG. 5 and described herein. Moreover, these operations may also be performed in an order different than the order described herein.

The routine 500 begins at operation 502 with providing a mid-fuselage section. The mid-fuselage section may be an uncured mid-fuselage barrel 100 fabricated of composite material. Typically, an uncured mid-fuselage barrel 100 would be provided after a laminating station in a fuselage assembly line. The uncured mid-fuselage barrel 100 may also be provided in an intermediate stage of the layup, with completion of the layup to be accomplished in a later stage. In other embodiments the mid-fuselage barrel 100 is a cured single barrel fuselage section. Typically, a cured mid-fuselage section would be provided after a curing station in a fuselage assembly line. In alternative embodiments this operation includes providing other fuselage sections, or fuselage components, or fuselage panels, and the like.

The routine 500 continues from operation 502 to operation 504 with providing a boron composite structural member 402, 412, 422 in the form of a keel. The boron composite structural member 402, 412, 422 may be cured, uncured, or partially cured. This operation may include providing a boron composite structural member 402, 412, 422 that is as long as the length of the mid-fuselage section. In some embodiments this operation may include providing a boron composite structural member 402, 412, 422 that is shorter than the length of the mid-fuselage section and that tapers into the main fuselage monocoque. In alternative embodiments this operation includes providing a boron composite structural member 402, 412, 422 that is longer than the length of a mid-fuselage section.

The routine 500 continues from operation 504 to operation 506 with securing a boron composite structural member 402, 412, 422 to the mid-fuselage section to construct an integral single, double, or triple fuselage keel 400, 410, 420. In some embodiments this operation includes applying carbon reinforced fiber attachment plies 406, 416, 426 to the mid-fuselage barrel section 404, 414, 424 and to a boron composite structural member 402, 412, 422. Additional carbon reinforced fiber attachment plies 406, 416, 426 may also be placed around the composite structural member 402, 412, 422 and on the mid-fuselage section to complete the fuselage bond assembly. In alternative embodiments this operation includes mechanically securing any number of boron composite structural members 402, 412, 422 to the mid-fuselage barrel section 404, 412, 424 to construct a keel of any size or configuration.

The routine 500 continues from operation 506 to operation 508 with curing the integral single, double, or triple keel 400, 410, 420 and mid-fuselage barrel section 404, 414, 424. This operation may include simultaneously curing the mid-fuselage barrel 100, the boron composite structural member 402, 412, 422, and the carbon reinforced fiber attachment plies 406, 416, 426. In alternative embodiments this operation may include separately curing either or both of the mid-fuselage barrel section 404, 414, 424 and boron composite structural member 402, 412, 422, and then curing the carbon reinforced fiber attachment plies 406, 416, 426.

The routine 500 continues from operation 508 to operation 510 with providing a second fuselage section. This operation includes providing a second fuselage section in the form of a fuselage barrel, or a fuselage component, or a fuselage panel, and the like. The route 500 continues from operation 510 to operation 512 with securing a first end of the keel to the second fuselage section. This operation may include attaching the mid-fuselage barrel 100 to the second fuselage section, such as by splicing together the circumferential joint of fuselage barrels configured to be matingly attached.

The routine 500 continues from operation 512 to operation 514 with providing a third fuselage section. This operation includes providing a third fuselage section in the form of a fuselage barrel, or a fuselage component, or a fuselage panel, and the like. The route 500 continues from operation 514 to operation 516 with securing a second end of the keel to the third fuselage section. This operation may include attaching the mid-fuselage barrel 100 to the second fuselage section, such as by splicing together the circumferential joint of fuselage barrels configured to be matingly attached. After attachment of the keel to the fuselage at operation 506, or operation 508, or operation 510 the routine 500 ends at 518.

Alternative embodiments of assembling an aircraft fuselage include mechanically attaching a boron composite structural member 402, 412, 422 to the mid-fuselage barrel section 404, 414, 424. Additional alternative embodiments include boron composite structural members not in the form of a keel. For example, structural members may be configured to be installed around door openings, to span circumferential joints, to strengthen areas of high flexure or bending, to support and spread dead loads, and as required by design criteria.

Advantages of an aircraft fuselage comprising a boron reinforced keel include less complicated fabrication than the contemporary practice of constructing and mechanically attaching an aluminum keel to the fuselage. Another advantage is that a boron reinforced keel should be smaller and lighter than an aluminum keel designed to carry equivalent loads.

The subject matter described above is provided by way of illustration only and should not be construed as limiting. Various modifications and changes may be made to the subject matter described herein without following the exemplary embodiments and applications illustrated and described, and without departing from the true spirit and scope of the present disclosure, which is set forth in the following claims.

What is claimed is:

1. A composite structural member system, comprising:
a plurality of composite structural members, each composite structural member including
a structural member core having
at least one diagonal interior fiber reinforced ply proximate to and orientated substantially diagonal to at least one of the boron fiber reinforced plies, configured to define the structural member core,
at least one perpendicular interior fiber reinforced ply proximate to and orientated substantially perpendicular to at least one of the boron fiber reinforced plies, configured to define the structural member core,
at least one parallel interior fiber reinforced ply proximate to and orientated substantially parallel to at least one of the baron fiber reinforced plies, configured to define a structural member core, and
a plurality of boron fiber reinforced plies oriented in a substantially longitudinal direction, wherein the plurality of boron fiber reinforced plies are disposed on each side of each of the at least one diagonal interior fiber reinforced ply, the at least one perpendicular interior fiber reinforced ply and the at least one parallel interior fiber reinforced ply, and
at least one exterior fiber reinforced ply substantially surrounding the structural member core, configured to define a structural member casing; and
an attachment ply layer encapsulating a substantial surface area of each of the composite structural members of the plurality of composite structural members in the substantially longitudinal direction, a portion of the attachment ply layer extending in a direction perpendicular to the at least one of the boron fiber reinforced plies towards adjacent composite structural members.

2. The composite structural member of claim 1, wherein the structural member core further includes a plurality of interior carbon fiber reinforced plies proximate to and oriented substantially longitudinal to at least one of the boron fiber reinforced plies, and configured to define the structural member core.

3. The composite structural member of claim 1, wherein the composite structural member further includes plies extending from at least one of the structural member core and the structural member casing, configured to define a first flange and a second flange projecting from opposing ends and aligned with the length of the at least one structural member core and the structural member casing.

4. The composite structural member of claim 1, wherein the structural member core and structural member casing are co-cured such that the structural member core is bonded to the structural member casing.

5. The composite structural member of claim 4, further comprising the composite structural member positioned within and attached to an aircraft fuselage.

6. A fuselage keel for a fuselage of an aircraft, the fuselage keel comprising:
   a plurality of composite structure members, each of the composite structure members including
      a structural member core having
         at least one diagonal interior fiber reinforced ply proximate to and oriented substantially diagonally to at least one of the boron fiber reinforced plies, configured to define the structural member core,
         at least one perpendicular interior fiber reinforced ply proximate to and oriented substantially perpendicularly to at least one of the boron fiber reinforced plies, configured to define the structural member core,
         at least one parallel inferior fiber reinforced ply proximate to and oriented substantially parallel to at least one of the boron fiber reinforced plies, configured to define the structural member core, and
         a plurality of boron fiber reinforced plies oriented in a substantially longitudinal direction, wherein the plurality of boron fiber reinforced plies are disposed on each side of each of the at least one diagonal interior fiber reinforced ply, the at lest one perpendicular interior fiber reinforced ply and the at least one parallel interior fiber reinforced ply, and
      at least one exterior fiber reinforced ply substantially surrounding the structural member core, configured to defined a structural member casing; and
   an attachment ply layer encapsulating a substantial surface area of each of the composite structure members of the plurality of composite structural members to the fuselage, a portion of the attachment ply layer extending in a direction perpendicular to the at least one of the boron fiber reinforced plies and forming one of an interior or exterior skin of the fuselage,
   wherein the fuselage keel is oriented substantially parallel to a longitudinal axis of the fuselage and reinforces the fuselage weakened by at least one cutout in the fuselage.

* * * * *